(12) United States Patent
Groshek (10) Patent No.: US 10,436,226 B2
(45) Date of Patent: Oct. 8, 2019

(54) COMPRESSOR HAVING SOUND CONTROL SYSTEM

(71) Applicant: Emerson Climate Technologies, Inc., Sidney, OH (US)

(72) Inventor: Jacob A. Groshek, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 321 days.

(21) Appl. No.: 15/413,984

(22) Filed: Jan. 24, 2017

(65) Prior Publication Data

US 2017/0241442 A1    Aug. 24, 2017

Related U.S. Application Data

(60) Provisional application No. 62/299,182, filed on Feb. 24, 2016.

(51) Int. Cl.
*F04D 29/66* (2006.01)
*F25B 31/02* (2006.01)
*F25B 49/02* (2006.01)

(52) U.S. Cl.
CPC ............ *F04D 29/667* (2013.01); *F25B 31/02* (2013.01); *F25B 49/02* (2013.01); *F25B 2500/12* (2013.01);
(Continued)

(58) Field of Classification Search
CPC ........ F04D 29/667; F25B 49/02; F25B 31/02; F25B 2700/171; F25B 2600/23;
(Continued)

(56) References Cited

U.S. PATENT DOCUMENTS 4,201,517 A * 5/1980 Ferguson .............. F04B 49/022
417/12
4,787,211 A    11/1988 Shaw
(Continued)

FOREIGN PATENT DOCUMENTS

CN    103403349 A    11/2013
CN    104314797 A    1/2015
(Continued)

OTHER PUBLICATIONS

Office Action regarding Chinese Patent Application No. 201710096521.5, dated Apr. 24, 2018. Translation provided by Unitalen Attorneys at Law.
(Continued)

*Primary Examiner* — Joseph J Dallo
(74) *Attorney, Agent, or Firm* — Harness, Dickey & Pierce, P.L.C.

(57) ABSTRACT

A climate-control system may include a compressor and a control module. The compressor includes a motor driving a compression mechanism to compress a working fluid. The control module is in communication with the motor and may be configured to determine a balance speed of the motor at which a forward-rotational inertial force of the compression mechanism is equal to a backward-rotational gas force on the compression mechanism. The control module may be configured to adjust a running speed of the motor to the balance speed after receipt of a compressor-shutdown-command and before shutting down the compressor.

20 Claims, 3 Drawing Sheets

(52) U.S. Cl.
CPC . *F25B 2600/021* (2013.01); *F25B 2600/0253* (2013.01); *F25B 2600/15* (2013.01); *F25B 2600/23* (2013.01); *F25B 2700/171* (2013.01); *F25B 2700/195* (2013.01); *F25B 2700/197* (2013.01); *F25B 2700/1931* (2013.01); *Y02B 30/741* (2013.01)

(58) Field of Classification Search
CPC ........... F25B 2600/15; F25B 2700/195; F25B 2600/021; F25B 2500/12; F25B 2700/197; F25B 2700/1931; F25B 2600/0253; Y02B 30/741
See application file for complete search history.

(56) References Cited

U.S. PATENT DOCUMENTS

| | | | | |
|---|---|---|---|---|
| 5,627,769 | A * | 5/1997 | Hallikainen | B60T 17/02 700/301 |
| 6,089,831 | A * | 7/2000 | Bruehmann | B60G 17/0523 303/3 |
| 6,394,758 | B1 * | 5/2002 | Lee | F04B 49/065 417/13 |
| 6,534,958 | B1 * | 3/2003 | Graber | F02B 63/04 123/2 |
| 7,226,273 | B2 * | 6/2007 | Doerr | B60T 17/02 417/212 |
| 7,344,201 | B1 * | 3/2008 | Bates | B60T 17/02 303/11 |
| 7,608,132 | B2 * | 10/2009 | Fornof | B60T 17/004 34/79 |
| 8,467,950 | B1 * | 6/2013 | Pfefferl | B60T 15/48 701/100 |
| 9,050,957 | B2 * | 6/2015 | Minato | B60T 13/662 |
| 9,266,515 | B2 * | 2/2016 | Pfefferl | B60T 17/004 |
| 9,926,924 | B2 * | 3/2018 | Bezze | F04B 49/065 |
| 10,124,785 | B2 * | 11/2018 | Books | B60R 16/0236 |
| 2002/0112489 | A1 * | 8/2002 | Egawa | B60H 1/3208 62/133 |
| 2007/0056300 | A1 | 3/2007 | Crane | |
| 2008/0286118 | A1 * | 11/2008 | Gu | F04C 18/0215 417/1 |
| 2009/0001866 | A1 | 1/2009 | Kaga et al. | |
| 2010/0186433 | A1 * | 7/2010 | Galante | F04C 18/0215 62/115 |
| 2010/0199950 | A1 * | 8/2010 | Renner | B66C 23/42 123/347 |
| 2012/0198869 | A1 * | 8/2012 | Morita | B60H 1/3208 62/126 |
| 2012/0237367 | A1 * | 9/2012 | Cunningham | F04F 5/20 417/55 |
| 2013/0064684 | A1 | 3/2013 | Endou | |
| 2013/0240043 | A1 * | 9/2013 | Pham | F04B 39/06 137/1 |
| 2014/0219846 | A1 * | 8/2014 | Ignatiev | F04C 18/0215 418/16 |
| 2014/0316583 | A1 * | 10/2014 | Ambriz | F24F 11/30 700/277 |
| 2015/0075766 | A1 | 3/2015 | Alston | |

FOREIGN PATENT DOCUMENTS

| | | |
|---|---|---|
| CN | 105258448 A | 1/2016 |
| CN | 105276914 A | 1/2016 |
| CN | 105298841 A | 2/2016 |
| DE | 102006013189 A1 | 11/2006 |
| EP | 2554929 A1 | 2/2013 |
| JP | H02225973 A | 9/1990 |
| KR | 20120007897 A | 1/2012 |

OTHER PUBLICATIONS

Search Report regarding European Patent Application No. 17157966.7, dated Jul. 11, 2017.

* cited by examiner

COMPRESSOR HAVING SOUND CONTROL SYSTEM

CROSS-REFERENCE TO RELATED APPLICATIONS

This application claims the benefit of U.S. Provisional Application No. 62/299,182, filed on Feb. 24, 2016. The entire disclosure of the above application is incorporated herein by reference.

FIELD

The present disclosure relates to a compressor having a sound control system.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, one or more indoor heat exchangers, one or more expansion devices disposed between the indoor and outdoor heat exchangers, and one or more compressors circulating a working fluid (e.g., refrigerant or carbon dioxide) between the indoor and outdoor heat exchangers. Compressors often make bothersome noises during a shutdown event. The present disclosure provides systems and methods for reducing noises associated with compressor shutdown events.

SUMMARY

This section provides a general summary of the disclosure, and is not a comprehensive disclosure of its full scope or all of its features.

In one form, the present disclosure provides a method for controlling compressor-shutdown-sound. The method may include receiving a compressor-shutdown-command; determining an actual pressure of working fluid within a climate-control system; comparing the actual pressure to a predetermined threshold pressure value; comparing a running speed of a compressor-motor to a predetermined threshold compressor-motor-speed; increasing the running speed after receipt of the compressor-shutdown-command based on the comparisons between the actual pressure and the predetermined threshold pressure value and between the running speed and the predetermined threshold compressor-motor-speed; and shutting down the compressor by discontinuing electrical power to the compressor-motor after increasing the running speed.

In some configurations, the step of increasing the running speed is performed after determining that the running speed is less than the predetermined threshold compressor-motor-speed.

In some configurations, the step of increasing the running speed is performed after determining that the actual pressure is greater than the predetermined threshold pressure value.

In some configurations, the method includes holding the compressor-motor in a shutdown state for a predetermined time period before allowing electrical power to the compressor-motor to resume.

In some configurations, the actual pressure of the working fluid is a pressure of compressed working fluid discharged from a compressor.

In some configurations, the actual pressure of the working fluid is a condensing pressure.

In some configurations, the method includes measuring the condensing pressure with a sensor.

In some configurations, the method includes receiving a second compressor-shutdown-command (e.g., a previous or subsequent shutdown command); determining a second actual pressure (e.g., a previous or subsequent actual pressure) upon receipt of the second compressor-shutdown-command; comparing the second actual pressure with the predetermined threshold pressure value; determining a second running speed (e.g., a previous or subsequent running speed) of the compressor-motor upon receipt of the second compressor-shutdown-command; and shutting down the compressor by discontinuing electrical power to the compressor-motor while the compressor-motor is operating at the second running speed and after comparing the second actual pressure with the predetermined threshold pressure value.

In another form, the present disclosure provides a system including a compressor and a control module. The compressor includes a motor driving a compression mechanism to compress a working fluid. The control module is in communication with the motor and may be configured to increase a running speed of the motor, after receipt of a compressor-shutdown-command, based on comparisons between an actual working-fluid-pressure and a predetermined threshold pressure value and between a predetermined threshold compressor-motor-speed and the running speed prior to the receipt of the compressor-shutdown-command.

In some configurations, the control module may be or include a variable-speed drive or may be in communication with a variable-speed drive.

In some configurations, the control module discontinues electrical power to the motor after increasing the running speed.

In some configurations, the control module increases the running speed after determining that the running speed is less than the predetermined threshold compressor-motor-speed.

In some configurations, the control module increases the running speed after determining that the actual working-fluid-pressure is greater than the predetermined threshold pressure value.

In some configurations, the control module holds the motor in a shutdown state for a predetermined time period before allowing electrical power to the motor to resume.

In some configurations, the actual working-fluid-pressure is a pressure of compressed working fluid discharged from the compressor.

In some configurations, the actual working-fluid-pressure is a condensing pressure.

In some configurations, the system includes a sensor measuring a parameter indicative of the condensing pressure. The sensor may be a temperature sensor or a pressure sensor, for example.

In another form, the present disclosure provides a method for controlling compressor-shutdown-sound. The method may include receiving a compressor-shutdown-command; determining a backward-rotational gas force on a compression mechanism of a compressor based on an actual pressure of working fluid discharged from the compressor; calculating a balance speed of a motor of the compressor at which a forward-rotational inertial force of the compression mechanism is equal to the backward-rotational gas force; adjusting a running speed of the motor to the balance speed after receipt of the compressor-shutdown-command; and shutting down the compressor by discontinuing electrical power to the motor after adjusting the running speed of the motor to the balance speed.

In some configurations, the method includes holding the motor in a shutdown state for a predetermined threshold time period before allowing electrical power to the motor to resume.

In some configurations, adjusting the running speed of the motor to the balance speed after receipt of the compressor-shutdown-command includes increasing the running speed after receipt of the compressor-shutdown-command.

In some configurations, the method includes measuring the actual pressure with a sensor.

In some configurations, the actual pressure of the working fluid is a condensing pressure.

In another form, the present disclosure provides a system that includes a compressor and a control module. The compressor includes a motor driving a compression mechanism to compress a working fluid. The control module is in communication with the motor and may be configured to determine a balance speed of the motor at which a forward-rotational inertial force of the compression mechanism is equal to a backward-rotational gas force on the compression mechanism. The control module may be configured to adjust a running speed of the motor to the balance speed after receipt of a compressor-shutdown-command and before shutting down the compressor.

In some configurations, the control module is configured to shut down the compressor by discontinuing electrical power to the motor after adjusting the running speed.

In some configurations, the control module is configured to hold the motor in a shutdown state for a predetermined time period before allowing electrical power to the motor to resume.

In some configurations, the control module is configured to determine the backward-rotational gas force based on an actual pressure of working fluid discharged from the compressor.

In some configurations, the actual pressure is a condensing pressure.

In some configurations, the system includes a sensor measuring a parameter indicative of the condensing pressure. The sensor may be a temperature sensor or a pressure sensor, for example.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
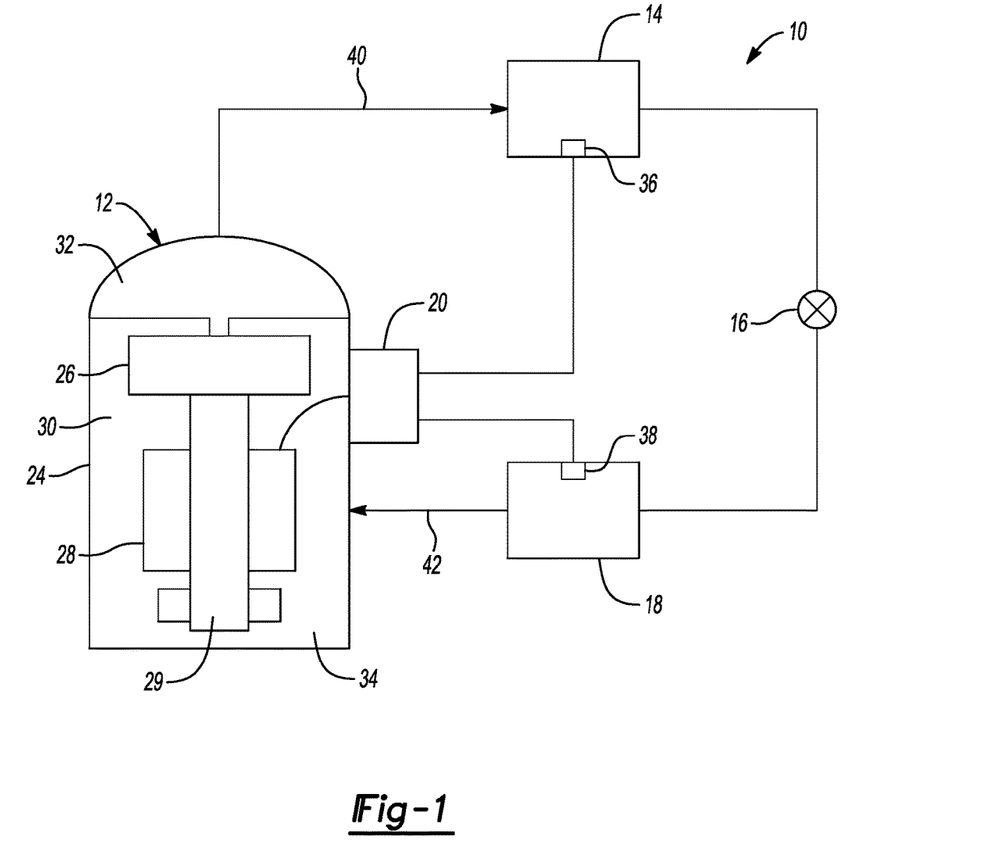
FIG. 1 is a schematic representation of an exemplary climate-control system according to the principles of the present disclosure.

With reference to FIG. 1, a climate-control system 10 is provided that may include a compressor 12, an outdoor heat exchanger 14 (e.g., a condenser or gas cooler), an expansion device 16 (e.g., an expansion valve or a capillary tube), an indoor heat exchanger 18 (e.g., an evaporator), and a control module 20. The compressor 12 compresses working fluid (e.g., refrigerant, carbon dioxide, ammonia, propane, etc.) and circulates the working fluid throughout the system 10. In some configurations, the climate-control system 10 may be a heat-pump system having a reversing valve (not shown) operable to control a direction of working fluid flow through the system 10 to switch the system 10 between a heating mode and a cooling mode. In some configurations, the climate-control system 10 may be an air-conditioning system or a refrigeration system, for example, and may be operable in only the cooling mode. As will be described in more detail below, the control module 20 may include processing circuitry that controls operation of the compressor 12 and a compressor-shutdown process to reduce noise associated with a compressor-shutdown event.

The compressor 12 may include a shell 24, a compression mechanism 26 and a motor 28. The compression mechanism 26 is disposed within the shell 24 and is driven by the motor 28 via a driveshaft 29. The control module 20 is in communication with the motor 28 and controls operation of the motor 28. The motor 28 may be a variable-speed motor or a multi-speed motor, for example. For example, the control module 20 may be or include a variable-frequency drive (or the control module 20 may be in communication with a variable-frequency drive) that controls the operation and speed of the motor 28.

In the particular configuration shown in FIG. 1, the compressor 12 is a low-side scroll compressor. That is, the compression mechanism 26 is a scroll compression mechanism (including an orbiting scroll and a non-orbiting scroll) disposed within a suction-pressure region 30 of the shell 24. The compression mechanism 26 draws suction-pressure working fluid from the suction-pressure region 30 and may discharge compressed working fluid into a discharge-pressure region 32 of the shell 24. The motor 28 may also be disposed within the suction-pressure region 30. A lower end of the suction-pressure region 30 of the shell 24 may define an oil sump 34 containing a volume of oil for lubrication and cooling of the compression mechanism 26, the motor 28 and other moving parts of the compressor 12.

While the compressor 12 is described above as a low-side compressor, in some configurations, the compressor 12 could be a high-side compressor (i.e., the compression mechanism 26, motor 28 and oil sump 34 could be disposed in a discharge-pressure region of the shell). Furthermore, in some configurations, the compressor 12 could be a reciprocating compressor or a rotary vane compressor, for example, rather than a scroll compressor.

In a cooling mode, the outdoor heat exchanger 14 may operate as a condenser or as a gas cooler and may cool discharge-pressure working fluid received from the compressor 12 by transferring heat from the working fluid to air forced over the outdoor heat exchanger 14 by a fan (not shown), for example. In the cooling mode, the indoor heat exchanger 18 may operate as an evaporator in which the working fluid absorbs heat from air forced over the indoor heat exchanger 18 by another fan. In a heating mode (in configurations where the system 10 is a heat pump), the outdoor heat exchanger 14 may operate as an evaporator, and the indoor heat exchanger 18 may operate as a condenser or as a gas cooler and may transfer heat from working fluid discharged from the compressor 12 to air forced over the indoor heat exchanger 18.

The control module 20 may be in communication with the motor 28 and first and second sensors 36, 38. The first sensor 36 may measure a temperature or pressure of compressed working fluid that has been discharged from the compressor 12 and communicate that data to the control module 20. In some configurations, the first sensor 36 may be disposed along a coil of the outdoor heat exchanger 14 (as shown in FIG. 1) and may measure condensing temperature or condensing pressure. In other configurations, the first sensor 36 may be disposed in the discharge-pressure region 32 of the compressor 12 or along a discharge line 40 through which compressed working fluid is transmitted from the compressor 12 to the outdoor heat exchanger 14.

The second sensor 38 may measure a temperature or pressure of low-pressure working fluid that upstream of the compressor 12 and communicate that data to the control module 20. In some configurations, the second sensor 38 may be disposed along a coil of the indoor heat exchanger 18 (as shown in FIG. 1) and may measure evaporating temperature or evaporating pressure. In other configurations, the second sensor 38 may be disposed in the suction-pressure region 30 of the compressor 12 or along a suction line 42 through which suction-pressure working fluid is transmitted from the indoor heat exchanger 18 to the compressor 12. In some configurations, the evaporating pressure or temperature can be inferred from other system or compressor operating parameters and transmitted to the control module 20.

Figure 2:
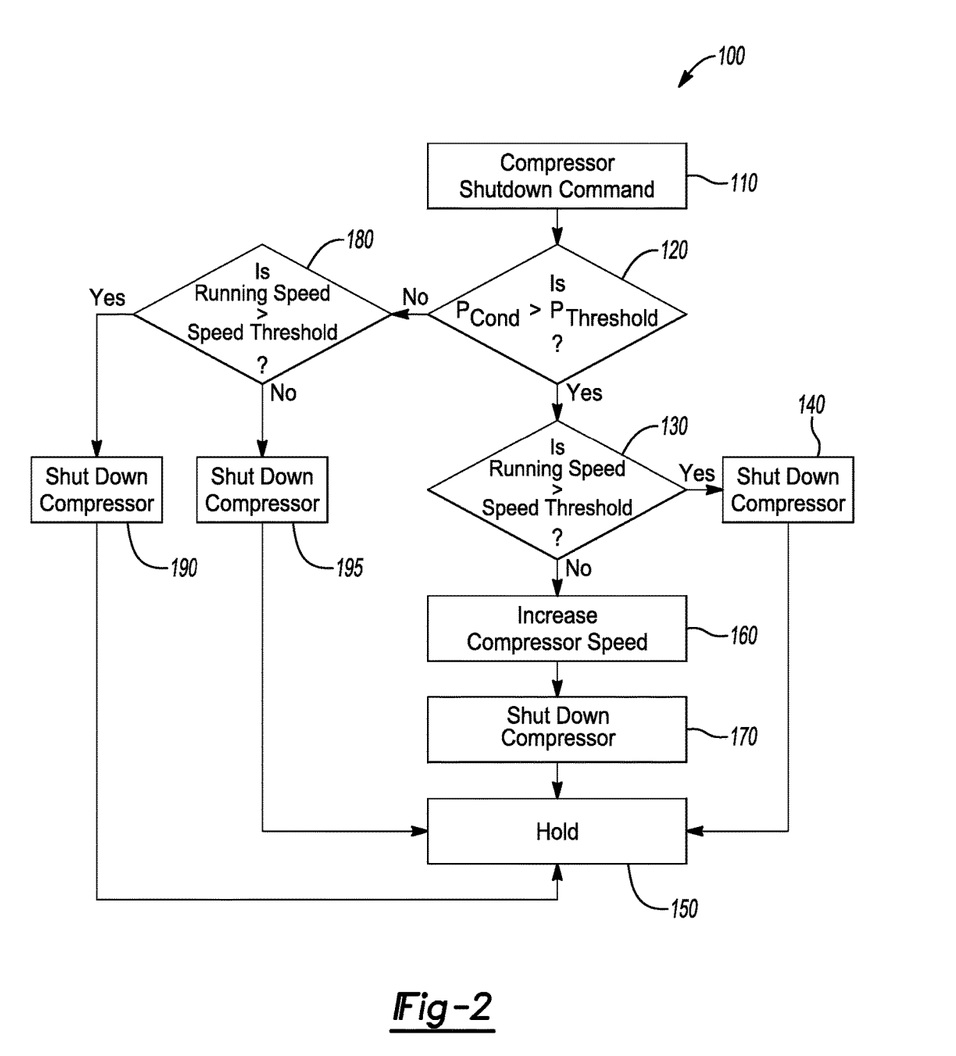
FIG. 2 is a flowchart illustrating a method for reducing compressor-shutdown-noise according to the principles of the present disclosure.

As described above, the control module 20 may control operation of the compressor 12 and a compressor-shutdown process to reduce noise associated with a compressor-shutdown event. FIG. 2 illustrates an exemplary compressor-shutdown process 100. At step 110 of the process 100, the control module 20 may generate and/or receive a command to shut down the compressor 12 (i.e., a command to shut down the motor 28). Thereafter, at step 120, the control module 20 may determine if an actual condensing pressure $P_{cond}$ is greater than a predetermined pressure threshold $P_{threshold}$. The actual condensing pressure $P_{cond}$ may be measured by the first sensor 36 upon receipt of the shutdown command and communicated to the control module 20. Alternatively, actual condensing pressure $P_{cond}$ may be a measurement taken by the first sensor 36 immediately before the shutdown command. In some configurations, the actual condensing pressure $P_{cond}$ may be calculated from other measured parameters, such as condensing temperature, for example. In some configurations, condensing pressure $P_{cond}$, condensing temperature and/or other parameters could be transmitted to the control module 20 by MODBUS, a master system controller, or other electronic means. In some configurations, the condensing pressure or temperature can be inferred from other system or compressor operating parameters and transmitted to the control module 20. In some configurations, an actual discharge pressure (rather than actual condensing pressure) can be compared with the pressure threshold $P_{threshold}$ at step 120. The pressure threshold $P_{threshold}$ may be a value determined by a manufacturer through sound testing to identify a risk of reverse rotation of the compression mechanism 26 caused by high-pressure working fluid flowing backwards (i.e., from the discharge-pressure region 32 toward the suction-pressure region 30) through the compression mechanism 26.

If the control module 20 determines that the actual condensing pressure $P_{cond}$ is greater than the pressure threshold $P_{threshold}$, the control module 20 may, at step 130, determine whether an actual running speed $S_{running}$ of the motor 28 is greater than a predetermined speed threshold $S_{threshold}$. The actual running speed $S_{running}$ may be a rotational speed at which the control module 20 (or some other controller or drive unit) was commanding the motor 28 to operate at the time of the shutdown command (or immediately prior to receipt of the shutdown command). In some configurations, the actual running speed $S_{running}$ may be measured by a sensor or calculated based on electrical current data and/or other parameters. The predetermined speed threshold $S_{threshold}$ may be determined by a manufacturer through sound testing to identify a threshold speed at which forward rotational inertia offsets backward rotational forces caused by high-pressure working fluid that bias the compression mechanism 26 in a reverse rotation direction. The predetermined speed threshold $S_{threshold}$ may also take into account the pressure of the forward-flowing suction gas in addition to the forward rotational inertia of the compression mechanism 26.

If the control module 20 determines at step 130 that the actual running speed $S_{running}$ is greater than (or equal to) the predetermined speed threshold $S_{threshold}$, the control module 20 may shut down the compressor 12 (i.e., discontinue electrical current to the motor 28) at step 140. Thereafter, at step 150, the control module 20 may hold the compressor 12 in a shutdown state for a predetermined time period (e.g., ten seconds or any other suitable time period) to ensure that the motor 28 and compression mechanism 26 come to a complete stop before the control module 20 starts the compressor 12 back up. This prevents the production of undesirable noises that may occur if the compressor 12 were to be started back up before the compression mechanism 26 and motor 28 came to a complete stop after shutdown.

If the control module 20 determines at step 130 that the actual running speed $S_{running}$ is less than the predetermined speed threshold $S_{threshold}$, the control module 20 may, at step 160, increase the running speed of the compressor 12 (i.e., increase the electrical power to the motor 28) to a predetermined pre-shutdown speed $S_{shutdown}$. In some configurations, the pre-shutdown speed $S_{shutdown}$ may be greater than or equal to the predetermined speed threshold $S_{threshold}$. However, during certain operating conditions of the system 10, the predetermined speed threshold $S_{threshold}$ may be higher than a maximum allowable speed for those operating conditions. For example, during operating conditions of the system 10 in which condensing temperature/pressure and evaporating temperature/pressure are both at or near the high end of the operating envelope, a maximum allowable speed for that portion of the operating envelope might be lower than the predetermined speed threshold $S_{threshold}$. During such operating conditions, the control module 20 may limit the pre-shutdown speed $S_{shutdown}$ to maximum allowable speed for that portion of the operating envelope.

Increasing the running speed $S_{running}$ at step 160 as described above (i.e., when the condensing pressure $P_{cond}$ is higher than the pressure threshold $P_{threshold}$) increases the forward rotational inertia of the compression mechanism 26 and motor 28 to a high enough level to offset the high backward rotational forces caused by such high condensing pressures. Compressor shutdown noise is reduced when forward rotational inertial forces and backward rotational forces balance each other or where forward rotational inertial forces are slightly greater than backward rotational forces.

After the compressor 12 reaches the pre-shutdown speed $S_{shutdown}$, the control module 20 may, at step 170, shut down the compressor (i.e., discontinue electrical current to the motor 28). Thereafter, the control module 20 may hold the compressor in the shutdown state for the predetermined time period at step 150.

If the control module 20 determines at step 120 that the actual condensing pressure $P_{cond}$ is less than the pressure threshold $P_{threshold}$, then the control module 20 may, at step 180, determine whether the actual running speed $S_{running}$ of the motor 28 is greater than the predetermined speed threshold $S_{threshold}$. If the control module 20 determines at step 180 that the actual running speed $S_{running}$ is greater than (or equal to) the predetermined speed threshold $S_{threshold}$, the control module 20 may shut down the compressor 12 (i.e., discontinue electrical current to the motor 28) at step 190 without increasing the running speed $S_{running}$. Thereafter, at step 150, the control module 20 may hold the compressor 12 in the shutdown state for the predetermined time period.

In some configurations, if the control module 20 determines at step 180 that the actual running speed $S_{running}$ is less than (or equal to) the predetermined speed threshold $S_{threshold}$, the control module 20 may shut down the compressor 12 (i.e., discontinue electrical current to the motor 28) at step 195 without increasing the running speed. Thereafter, at step 150, the control module 20 may hold the compressor 12 in the shutdown state for the predetermined time period. In other configurations, the control module 20 may be programmed such that when the control module 20 determines at step 180 that the running speed $S_{running}$ is less than the predetermined speed threshold $S_{threshold}$, the control module 20 may increase the running speed $S_{running}$ to the pre-shutdown speed $S_{shutdown}$ prior to shutting down the compressor at step 195. Sound testing may determine whether a speed increase before shutdown at step 195 is appropriate or beneficial.

After the hold at step 150, the control module 20 may restart the compressor 12 according to system demand. Thereafter, the logic and steps of the process 100 described above can be repeated upon receipt of the next shutdown command.

Figure 3:
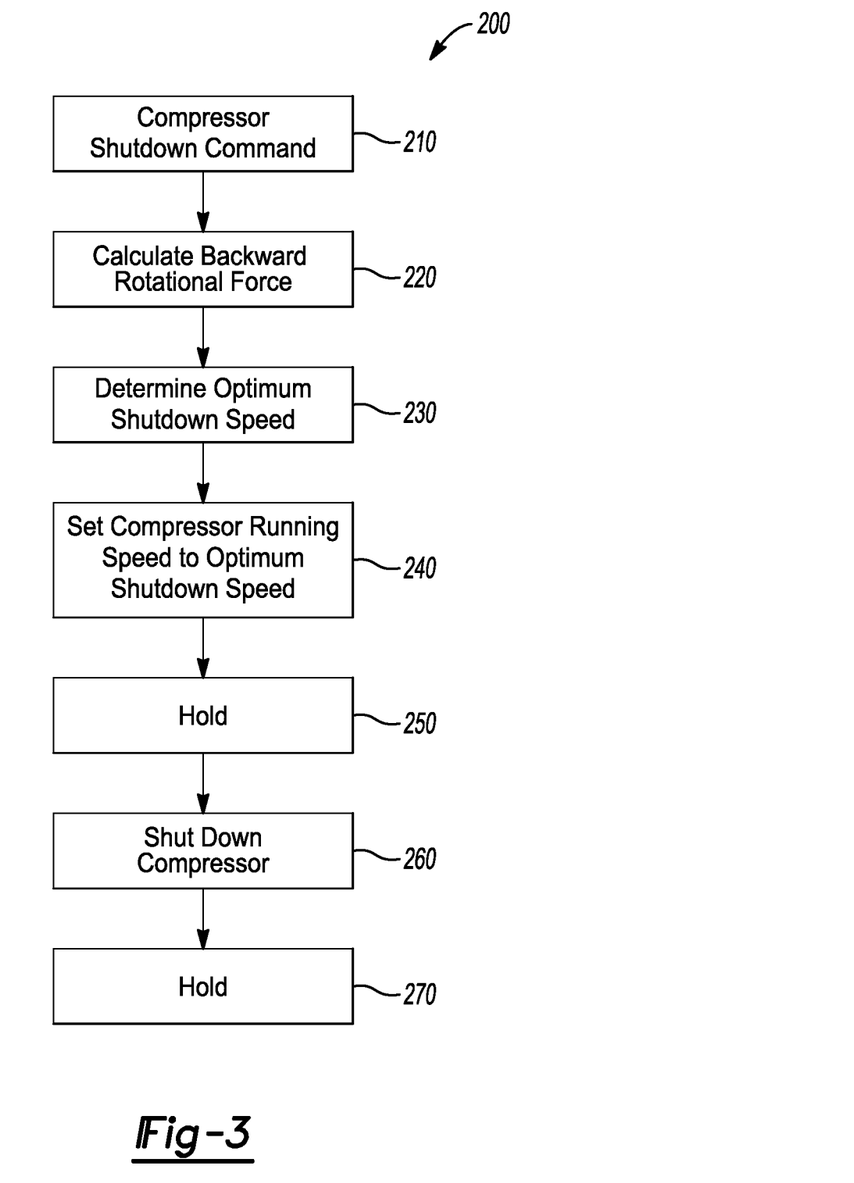
FIG. 3 is a flowchart illustrating another method for reducing compressor-shutdown-noise according to the principles of the present disclosure.

Referring now to FIG. 3, another compressor-shutdown process 200 is provided. The shutdown process 200 balances forward rotational inertial force $F_I$ of the motor 28 and compression mechanism 26 with a backward rotational force $F_R$ caused by high-pressure working fluid biasing the compression mechanism 26 in a reverse rotation direction. Balancing these rotational forces at shutdown reduces noise associated with the shutdown event.

At step 210 of the process 200, the control module 20 may generate and/or receive a command to shut down the compressor 12 (i.e., a command to shut down the motor 28). At step 220, the control module 20 may determine the backward rotational force $F_R$ caused by high-pressure working fluid biasing the compression mechanism 26 in the reverse rotation direction. The backward rotational force $F_R$ can be calculated as a function of scroll geometry (which is known or can be determined by the compressor manufacturer and pre-programmed into the control module 20) and condensing pressure at the time of the shutdown command (which can be measured by the first sensor 36 or calculated based on other measured parameters).

At step 230, the control module 20 may determine an optimum shutdown speed $S_o$ at which the motor 28 should be operating at shutdown to balance the forward and backward rotational forces $F_I$, $F_R$ to minimize shutdown noise. The shutdown speed $S_o$ can be calculated based on the backward rotational force $F_R$ calculated at step 220. The shutdown speed $S_o$ may be a rotational speed at which the forward rotational inertial force $F_I$ is equal to the backward rotational force $F_R$. The shutdown speed $S_o$ may also take into account the pressure of the forward-flowing suction gas in addition to the forward rotational inertia $F_I$ of the compression mechanism 26.

The forward rotational inertial force $F_I$ can be calculated as a function of mass M times rotational speed. The mass M is the combined mass of the rotor of motor 28, the driveshaft 29 (including counterweights, bushings etc.), the orbiting scroll, and any other components that rotate or orbit with the motor 28 or compression mechanism 26. The mass M can be predetermined by the compressor manufacturer and pre-programmed into the control module 20.

Therefore, using the pre-programmed mass M and the backward rotational force $F_R$ calculated at step 220, the control module 20 can solve the equation $F_I = F_R$ for the optimum shutdown speed $S_o$ at step 230. At step 240, the control module 20 can increase or decrease the running speed $S_{running}$ of the motor 28 to the optimum shutdown speed $S_o$.

At step 250, the control module 20 may hold the motor 28 at the optimum shutdown speed $S_o$ for a predetermined time period (five to ten seconds, for example) to ensure that the motor 28 attains the optimum shutdown speed $S_o$. Thereafter, at step 260, the control module 20 may shutdown the compressor 12 (i.e., discontinue electrical power to the motor 28). At step 270, the control module 20 may hold the compressor 12 in the shutdown state for a predetermined time period (e.g., ten seconds or any other suitable time period) to ensure that the motor 28 and compression mechanism 26 come to a complete stop before the control module 20 starts the compressor 12 back up.

After the hold at step 270, the control module 20 may restart the compressor 12 according to system demand. Thereafter, the logic and steps of the process 200 described above can be repeated upon receipt of the next shutdown command.

In this application, including the definitions below, the term "module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for controlling compressor-shutdown-sound comprising:
   receiving a compressor-shutdown-command;
   determining an actual pressure of working fluid within a climate-control system;
   comparing the actual pressure to a predetermined threshold pressure value;
   comparing a running speed of a compressor-motor to a predetermined threshold compressor-motor-speed;
   increasing the running speed in response to receipt of the compressor-shutdown-command and based on the comparisons between the actual pressure and the predetermined threshold pressure value and between the running speed and the predetermined threshold compressor-motor-speed; and
   shutting down the compressor by discontinuing electrical power to the compressor-motor after increasing the running speed.

2. The method of claim 1, wherein the step of increasing the running speed is performed after determining that the running speed is less than the predetermined threshold compressor-motor-speed.

3. The method of claim 2, wherein the step of increasing the running speed is performed after determining that the actual pressure is greater than the predetermined threshold pressure value.

4. The method of claim 1, wherein the actual pressure of the working fluid is a pressure of compressed working fluid discharged from a compressor.

5. The method of claim 1, wherein the actual pressure of the working fluid is a condensing pressure.

6. A system comprising:
   a compressor including a motor driving a compression mechanism to compress a working fluid; and
   a control module in communication with the motor and configured to increase a running speed of the motor in response to receipt of a compressor-shutdown-command and based on comparisons between an actual working-fluid-pressure and a predetermined threshold pressure value and between a predetermined threshold compressor-motor-speed and the running speed prior to the receipt of the compressor-shutdown-command.

7. The system of claim 6, wherein the control module discontinues electrical power to the motor after increasing the running speed.

8. The system of claim 7, wherein the control module increases the running speed after determining that the running speed is less than the predetermined threshold compressor-motor-speed.

9. The system of claim 8, wherein the control module increases the running speed after determining that the actual working-fluid-pressure is greater than the predetermined threshold pressure value.

10. The system of claim 6, wherein the actual working-fluid-pressure is a pressure of compressed working fluid discharged from the compressor.

11. The system of claim 6, wherein the actual working-fluid-pressure is a condensing pressure.

12. The system of claim 11, further comprising a sensor measuring a parameter indicative of the condensing pressure.

13. A method for controlling compressor-shutdown-sound comprising:
   receiving a compressor-shutdown-command;
   determining a backward-rotational gas force on a compression mechanism of a compressor based on an actual pressure of working fluid discharged from the compressor;
   calculating a balance speed of a motor of the compressor at which a forward-rotational inertial force of the compression mechanism is equal to the backward-rotational gas force;
   adjusting a running speed of the motor to the balance speed in response to receipt of the compressor-shutdown-command; and
   shutting down the compressor by discontinuing electrical power to the motor after adjusting the running speed of the motor to the balance speed.

14. The method of claim 13, wherein adjusting the running speed of the motor to the balance speed after receipt of the compressor-shutdown-command includes increasing the running speed after receipt of the compressor-shutdown-command.

15. The method of claim 13, wherein the actual pressure of the working fluid is a condensing pressure.

16. A system comprising:
   a compressor including a motor driving a compression mechanism to compress a working fluid; and
   a control module in communication with the motor and configured to determine a balance speed of the motor at which a forward-rotational inertial force of the compression mechanism is equal to a backward-rotational gas force on the compression mechanism, the control module configured to adjust a running speed of the motor to the balance speed in response to receipt of a compressor-shutdown-command and before shutting down the compressor.

17. The system of claim 16, wherein the control module is configured to shut down the compressor by discontinuing electrical power to the motor after adjusting the running speed.

18. The system of claim 17, wherein the control module is configured to determine the backward-rotational gas force based on an actual pressure of working fluid discharged from the compressor.

19. The system of claim 18, wherein the actual pressure is a condensing pressure.

20. The system of claim 19, further comprising a sensor measuring a parameter indicative of the condensing pressure.

* * * * *